Jan. 24, 1961 M. I. JACOB ET AL 2,969,508

GRID MODULATION SYSTEM FOR SIMULTANEOUS
AM AND FM TRANSMISSIONS
Filed June 28, 1957

INVENTORS
Mark I. Jacob
William R. Wilson,

BY B. L. Zangwill
ATTORNEY

United States Patent Office 2,969,508

Patented Jan. 24, 1961

2,969,508

GRID MODULATION SYSTEM FOR SIMULTANEOUS AM AND FM TRANSMISSIONS

Mark I. Jacob, Catonsville, Md., and William R. Wilson, St. Louis Park, Minn., assignors, by mesne assignments, to the United States of America as represented by the Secretary of the Navy Filed June 28, 1957, Ser. No. 668,826

1 Claim. (Cl. 332—38)

This invention relates to a method and system of amplitude grid modulation of a radio frequency amplifier in which the grid bias is automatically adjusted to the value which insures maximum rated power output from the output amplifier for any condition or percentage of modulation.

In grid modulator systems the audio voltage varies the grid bias and thereby the power output of the RF stage. The plate voltage is held constant and the increase in power output with modulation is obtained by changing both plate current and efficiency. At 100% modulation the peak plate current and efficiency are doubled and the peak power is four times the average carrier power. However, under carrier conditions of the RF output is about ¼ of the maximum power obtainable with the same size tube which is plate modulated. In usual applications using conventional grid modulation systems, the limitations using conventional grid modulation systems, the limitation of lower RF output overshadows the advantage of low audio power requirements and for this reason grid modulation systems are not frequently used. There are however applications in which grid modulation can be utilized to the fullest advantages especially if the method of this invention is employed.

Frequently it is desirable that a radio transmitter provide regular communication while simultaneously serving as a radio beacon. In such applications it is essential that beacon identification be provided without interruption to the communication transmission. A simple means of providing such identification, particularly during frequency shift and similar frequency modulation types of communication, is to superimpose amplitude modulation on the carrier. Periodic keying of the audio amplitude modulation at a slow rate provides a positive method of identification.

Identification is customarily performed at periodic intervals and occupies only a small portion of the total transmission time. It is usually desirable to operate the transmitter at the maximum power output under all conditions in order to achieve maximum range and efficiency. This in turn requires that the audio identification modulation be of the downward type so that the maximum operating conditions will not be exceeded. Modulation can be any one of the conventional types, but grid modulation would be simplest and least costly, particularly with high power amplifiers operating class C.

It is therefore an object of this invention to provide a grid modulation system for a class C amplifier where the maximum amount of output is achieved from the output amplifier and additional means are provided for modulating the RF carrier at an audio frequency rate.

Another object is to take advantage of the low audio power requirement of grid modulation systems.

Another object is to provide a low impedance bias source so that the varying class C grid impedance caused by the modulating cycle does not result in varying the selected bias.

These and other objects of the invention will become more apparent by referring to the attached drawing in which.

Figure 1:
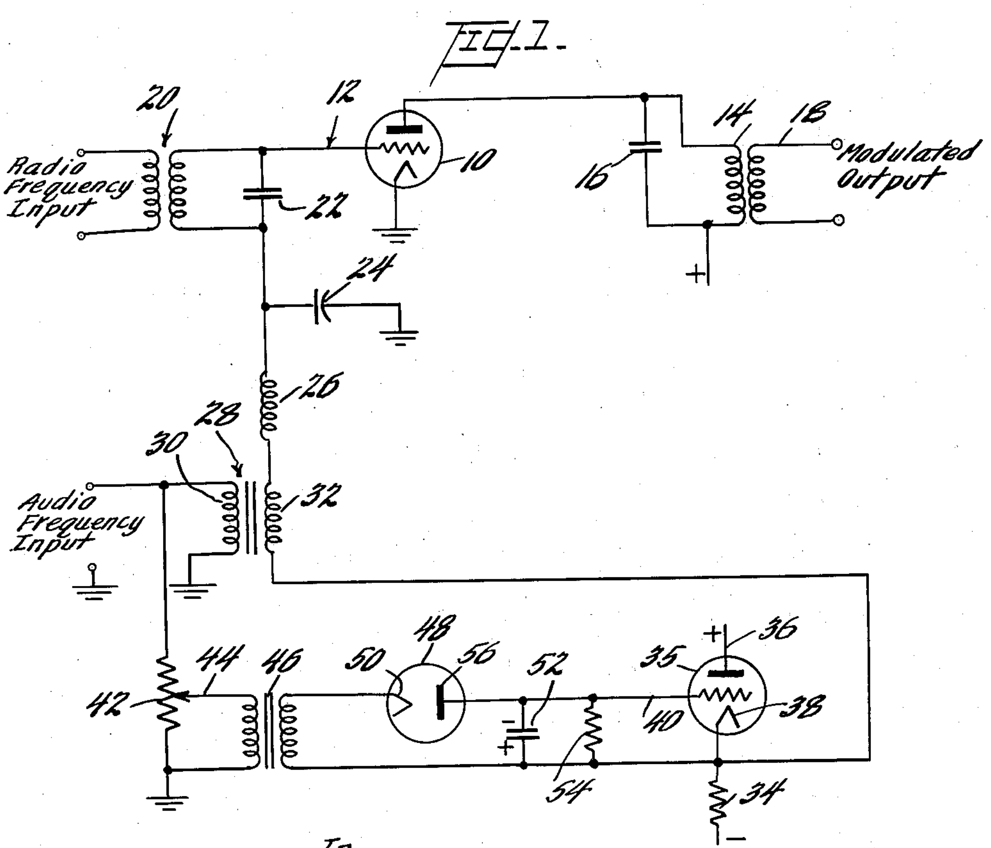
Fig. 1 is a schematic diagram of the invention.

Referring to Fig. 1, there is disclosed an output amplifier 10 having a control element or grid 12 where the output feeds into a tuned circuit composed of inductance 14 and a capacitor 16. Suitable output coils 18 are provided for taking the modulated output to an antenna or other suitable device.

The radio frequency input is applied to the control grid 12 by means of a tuned circuit comprising a transformer secondary 20 and a capacitor 22 which are tuned to the resonant frequency of the RF input. A radio frequency bypass capacitor 24 is used to provide a low impedance circuit to ground for the radio frequency input and a radio frequency choke 26 is used to isolate the radio frequency source from the modulating voltage or audio input. The modulating voltage is applied to transformer 28 composed of a primary 30 and a secondary 32. The secondary winding 32 is connected to the radio frequency choke 26 and to a biasing resistor 34. The biasing resistor 34 is shown connected to a suitable negative supply voltage.

Figure 2:
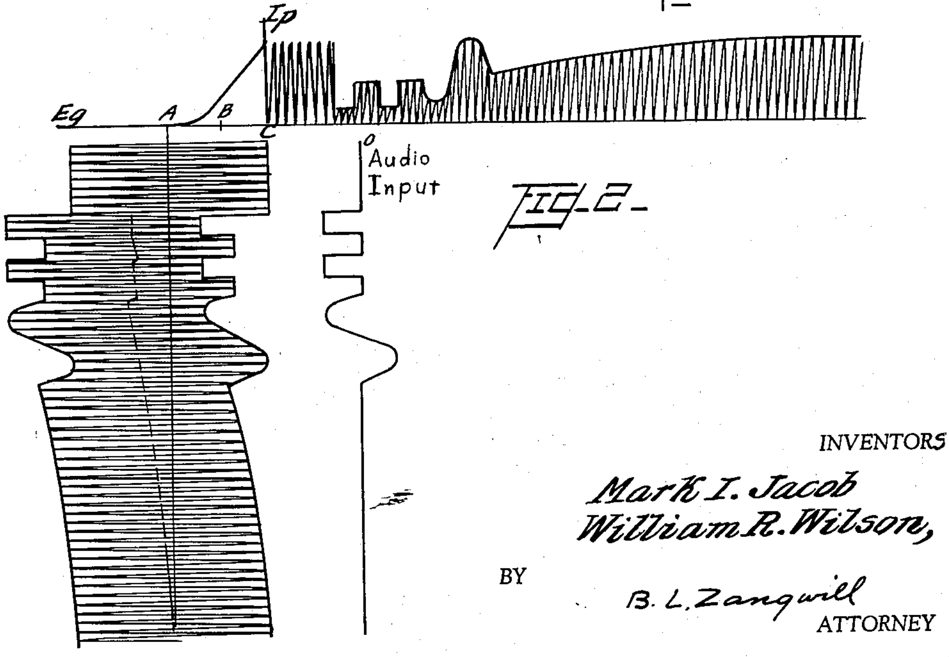
Fig. 2 is a graphical representation of the wave forms of the grid circuit voltage and plate current of the class C output tube.

In conventional grid modulation systems the output tube 10 would normally have a grid 12 biased to point A in Fig. 2 with the amplitude of the radio frequency input adjusted so that it comes to a point mraked B in Fig. 2. The audio frequency modulation then varies the peak of the carrier from point A to point C. It will be noted that the average carrier output with no modulation (point B) is about 50% of the normal plate current and about 50% of the permitted plate voltage swing and therefore with an average power output of ¼ that attained under maximum modulation conditions.

In the applicants' invention the amplitude of the carrier is increased so that it normally operates at point C. When modulation of the downward type such as shown in Fig. 2 is applied to the audio frequency input, the carrier is modulated and additional means are provided to shift the operating point of the carrier by adjusting the grid bias so that variable modulating potentials such as voice communication may be used.

The means of varying the point of operation of the grid 12 is shown in Fig. 1 where a cathode follower tube 35 having a plate 36 connected to a suitable voltage supply, a cathode 38 connected to one terminal of the biasing resistor 34, and a grid 40 which is suitably energized by the modulating signals.

The audio input is applied to a potentiometer 42 which has a tap 44 for applying a specified percentage of the audio signal to a transformer 46.

A rectifier 48 is connected to the transformer 46 by means of its cathode 50. The plate 56 of rectifier 48 is connected to one side of a capacitor 52 and the other side of the capacitor 52 is connected to the transformer 46 forming a rectifying circuit for the audio modulation. A resistor 54 is connected across the capacitor 52 and also has one terminal connected to the control grid 40 of tube 35 and the other terminal to the juncture of cathode 38 and resistor 34. The rectifier 48 rectifies the negative half of the audio input and, by means of condenser 52, applies this rectified voltage to tube 35 which acts to decrease the voltage at cathode 38 and thereby tends to cut off control element 12 of the tube 10.

This is disclosed graphically in Fig. 2 where a step function input of the audio signal causes the rectifier 48 to charge up capacitor 52 and increase the bias in a negative direction on control element 12. The modulation is also applied to secondary winding 32 which also increases the negative signal in the negative direction on element 12 and almost driving tube 10 to cut-off. Capacitor 52 discharges through resistor 54 towards zero and eventually would return the operating point of grid 12 back to the reference line marked A. The discharge time of capacitor 52 and resistor 54 is made large compared to the time of one cycle of the lowest audio frequency to be used. Thus, the modulating signal is allowed to appear undistorted at the grid and plate of tube 10. After a suitable length of time, however, when no modulating voltage is present, the operating point of control grid 12 returns to line A so that the maximum output from the amplifier tube 10 is achieved when there is no modulating signal.

The automatic control of the bias of control grid 12 insures that the maximum power output of the class C amplifier would be available at all times when there is no modulation. In addition it allows modulating signals to be amplified and sent out, such as for use on a radio beacon. Any suitable type of radio frequency signal may be used, such as a constant frequency wave or a variable frequency wave which would be used in a frequency modulating system.

In addition the use of cathode follower tube 35 in conjunction with biasing resistor 34 makes available a very low impedance grid source so that the changes in amplitude of the modulating frequency do not change the automatically selected bias of tube 10. It should be understood of course that the foregoing disclosure relates only to a preferred embodiment of the invention and that numerous modifications or alterations may be made therein without departing from the spirit or the scope of the invention as set forth in the appended claim.

What is claimed is:

In a system for grid modulating a class C amplifier for simultaneous AM and FM transmissions including an RF output amplifier having at least one control grid, a radio frequency generator connected to said grid for applying a carrier signal thereto, an audio frequency generator connected to said radio frequency generator having a modulating signal output for modulating said carrier signal, the combination with said system of a low impedance grid biasing source for biasing said control grid for maximum output of said amplifier despite variations in the modulating signal comprising a biasing resistor having two terminals with a first terminal connected to said audio frequency generator and a second terminal adapted to be connected to a source of negative voltage, a low impedance output cathode follower tube for applying a control voltage to said biasing resistor having a cathode connected to said first terminal of said biasing resistor, a plate adapted to be connected to a suitable voltage supply, and a control electrode, a capacitor connected between said control electrode and cathode, a discharge resistor connected across said capacitor where the RC time constant of said resistor and capacitor is large compared to the time of one cycle of the lowest audio frequency to be used, a rectifier connected to said capacitor, and transformer means connected between said rectifier and said audio frequency generator for applying the output of said generator to said rectifier to apply said control voltage to said biasing resistor whereby the bias on said amplifier will be increased in the negative direction by an amount equal to said audio signal and the output of the amplifier will be decreased when there is an output from the audio frequency generator.

References Cited in the file of this patent

UNITED STATES PATENTS

| | | |
|---|---|---|
| 1,982,558 | Whitman | Nov. 27, 1934 |
| 2,131,443 | Kummerer et al. | Sept. 27, 1938 |
| 2,189,897 | Gutzmann et al. | Feb. 13, 1940 |
| 2,224,690 | Moodey et al. | Dec. 10, 1940 |
| 2,243,719 | Peterson | May 27, 1941 |
| 2,275,287 | Crosby | Mar. 3, 1942 |
| 2,429,755 | Hallmark | Oct. 26, 1947 |
| 2,472,195 | Cooper et al. | June 7, 1949 |

FOREIGN PATENTS

| | | |
|---|---|---|
| 837,405 | Germany | Apr. 28, 1952 |